United States Patent
Hammoud (10) Patent No.: US 7,620,216 B2
(45) Date of Patent: Nov. 17, 2009

(54) METHOD OF TRACKING A HUMAN EYE IN A VIDEO IMAGE

(75) Inventor: Riad I. Hammoud, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 553 days.

(21) Appl. No.: 11/452,871

(22) Filed: Jun. 14, 2006

(65) Prior Publication Data

US 2007/0291983 A1    Dec. 20, 2007

(51) Int. Cl.
    *G06K 9/00*    (2006.01)
    *G06K 9/62*    (2006.01)
    *G06K 9/36*    (2006.01)
    *H04N 7/18*    (2006.01)

(52) U.S. Cl. .............. 382/117; 382/103; 382/209; 382/291; 348/78

(58) Field of Classification Search ............... 382/103, 382/117–118, 170, 209, 217–218, 236, 291; 348/78; 351/209
    See application file for complete search history.

(56) References Cited

U.S. PATENT DOCUMENTS

| | | | |
|---|---|---|---|
| 5,016,282 A | 5/1991 | Tomono et al. | |
| 5,243,418 A * | 9/1993 | Kuno et al. | 348/155 |
| 5,795,306 A | 8/1998 | Shimotani et al. | |
| 5,818,954 A | 10/1998 | Tomono et al. | |
| RE36,041 E | 1/1999 | Turk et al. | |
| 5,878,156 A * | 3/1999 | Okumura | 382/118 |
| 5,926,251 A | 7/1999 | Okumura | |
| 6,097,295 A | 8/2000 | Griesinger et al. | |
| 6,130,617 A | 10/2000 | Yeo | |
| 6,243,015 B1 | 6/2001 | Yeo | |
| 6,304,187 B1 | 10/2001 | Pirim | |
| 6,381,345 B1 | 4/2002 | Swain | |
| 6,571,002 B1 | 5/2003 | Ogawa | |
| 6,895,103 B2 * | 5/2005 | Chen et al. | 382/117 |

OTHER PUBLICATIONS

Hansen, Hammoud, Boosting Particle Filter-based Eye Tracker Performance Through Adapted Likelihood Function, IEEE International, Pub. 2005.
Conference on Advanced Video and Signal based Surveillance, Sep. 15-16, 2005, pp. 111-116.

* cited by examiner

*Primary Examiner*—Samir A. Ahmed
*Assistant Examiner*—Fred Hu
(74) *Attorney, Agent, or Firm*—Jimmy L. Funke (57) ABSTRACT

A human eye is tracked between successively produced video image frames by consecutively applied eye location techniques. First, potential eye candidates within a local search window are identified using horizontal projection filtering, coupled with rudimentary appearance-based testing. The identified eye candidates are clustered and subjected to additional appearance-based testing to determine if one or more eye candidates should be accepted. If no eye candidates are accepted, a correlation/appearance technique is applied to the search window to identify the eye. If unsuccessful, the eye may be closed, and peripheral eye-related patches from the previous image frame are extracted and compared with the search window to identify the eye in the current frame. When comparable eye-related patches are identified in the search window for the current frame, the eye center is computed according to the mean of the eye periphery patches.

6 Claims, 9 Drawing Sheets

METHOD OF TRACKING A HUMAN EYE IN A VIDEO IMAGE

TECHNICAL FIELD

The present invention relates to a method of tracking a human's eyes in successively produced video image frames.

BACKGROUND OF THE INVENTION

Vision systems frequently entail detecting and tracking a person's eyes in a stream of images generated by a video camera. In the motor vehicle environment, for example, a camera can be used to generate an image of the driver's face, and portions of the image corresponding to the driver's eyes can be analyzed to assess drive gaze or drowsiness. See, for example, the U.S. Pat. Nos. 5,795,306; 5,878,156; 5,926,251; 6,097,295; 6,130,617; 6,243,015; 6,304,187; and 6,571,002, incorporated herein by reference.

While eye detection and tracking algorithms can work reasonably well in a controlled environment, they tend to perform poorly under real world imaging conditions where the lighting produces shadows and the person's eyes can be occluded by eyeglasses, sunglasses or makeup. As a result, pixel clusters associated with the eyes tend to be grouped together with non-eye features and discarded when subjected to appearance-based testing. This problem occurs both in eye detection routines that initially locate the eyes, and in eye tracking routines that track the eye from one image frame to the next. Problems that especially plague eye tracking include head movement and eye blinking, both of which can cause previously detected eyes to suddenly disappear. The usual approach in such cases is to abandon the tracking routine and re-initialize the eye detection routine, which of course places a heavy processing burden on the system and slows the system response. Accordingly, what is needed is an efficient method of reliably tracking a person's eyes between successively produced video image frames, even in situations where the person's head turns or the eyes momentarily close.

SUMMARY OF THE INVENTION

The present invention is directed to an efficient and reliable method of tracking a human eye between successively produced video image frames. Once the eye is detected, its location is used to define a search window in the next image frame. Potential eye candidates within the search window are identified using horizontal projection filtering, coupled with rudimentary appearance-based testing. The identified eye candidates are clustered and subjected to additional appearance-based testing to determine if one or more eye candidates should be accepted. If no eye candidates are accepted, a correlation/appearance technique is applied to the search window to identify the eye. If the correlation or appearance test results do not meet predefined criteria, it is assumed that the eye is closed, and peripheral eye-related patches from the previous image frame are extracted and compared with the search window to identify corresponding features in the search window for the current frame. When comparable eye-related patches are identified in the search window for the current frame, the eye center is computed according to the mean of the eye periphery patches. Only when all of these techniques fail to locate an eye in the search window is the tracking routine abandoned and the eye detection routine re-initialized.

DESCRIPTION OF THE PREFERRED EMBODIMENT

The method of the present invention is disclosed in the context of a system that monitors a driver of a motor vehicle. However, it will be recognized that the method of this invention is equally applicable to other vision systems that detect and track eye movement, whether vehicular or non-vehicular, and to systems that detect and track other types of features or targets.

Figure 1:
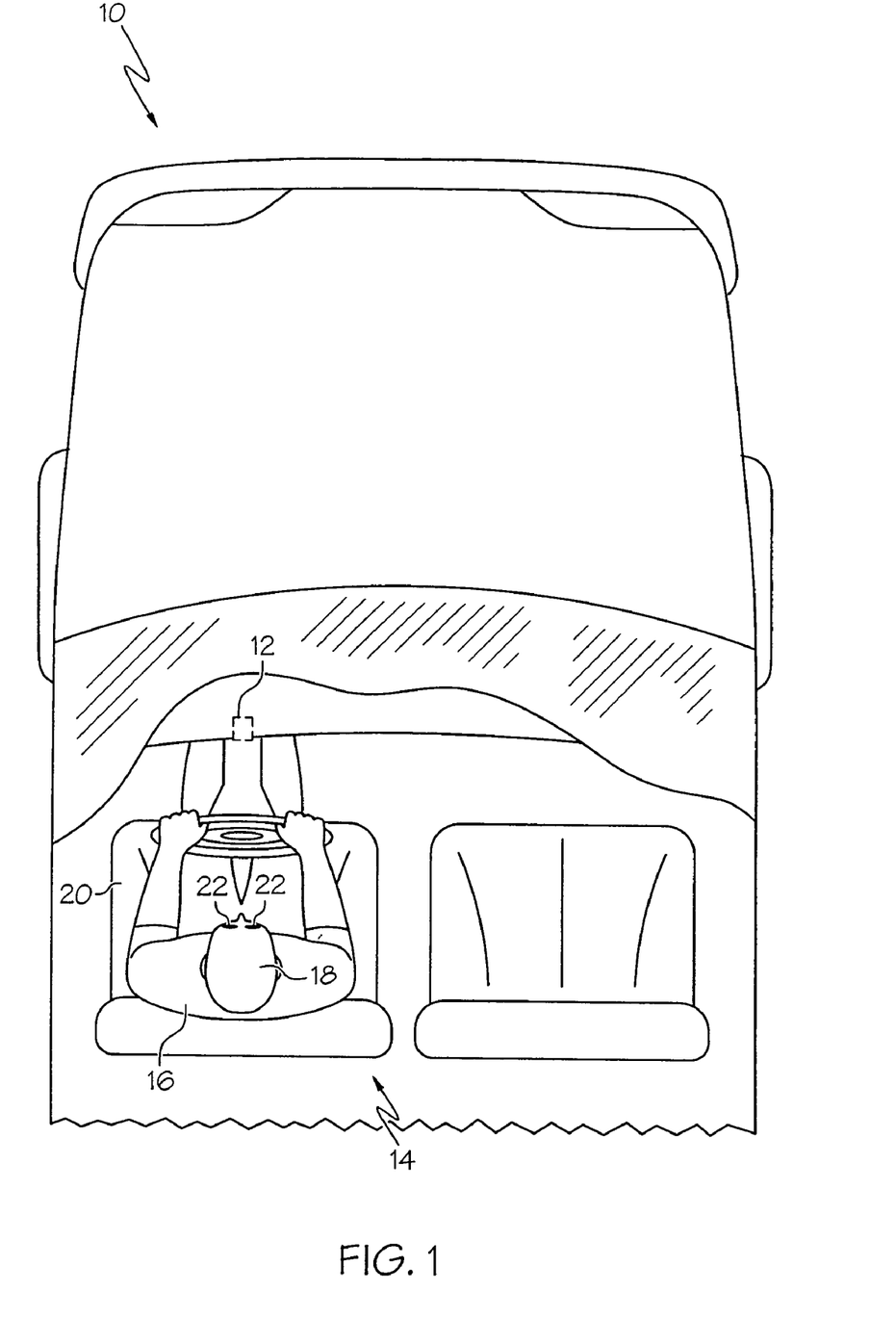
FIG. 1 depicts a diagram of a vehicle equipped with an eye monitoring apparatus based on the present invention.

Referring to the drawings, and particularly to FIG. 1, the reference numeral 10 generally designates a motor vehicle equipped with an eye monitoring apparatus 12 according to the present invention. In the illustration of FIG. 1, the apparatus 12 is mounted in the passenger compartment 14 forward of the driver 16 in a location that affords an unobstructed view of the driver's face 18 when the driver 16 is reposed on the seat 20, taking into account differences in driver height and orientation. In general, the eye monitoring apparatus 12 produces a series of video images of the driver's face 18, and executes digital signal processing routines for detecting portions of a given image that correspond to the driver's eyes 22 and tracking the eye location between successively produced video images. The state of the eyes 22 can be characterized for various purposes such as detecting driver drowsiness and/or distraction, or even driver gaze.

Figure 2:
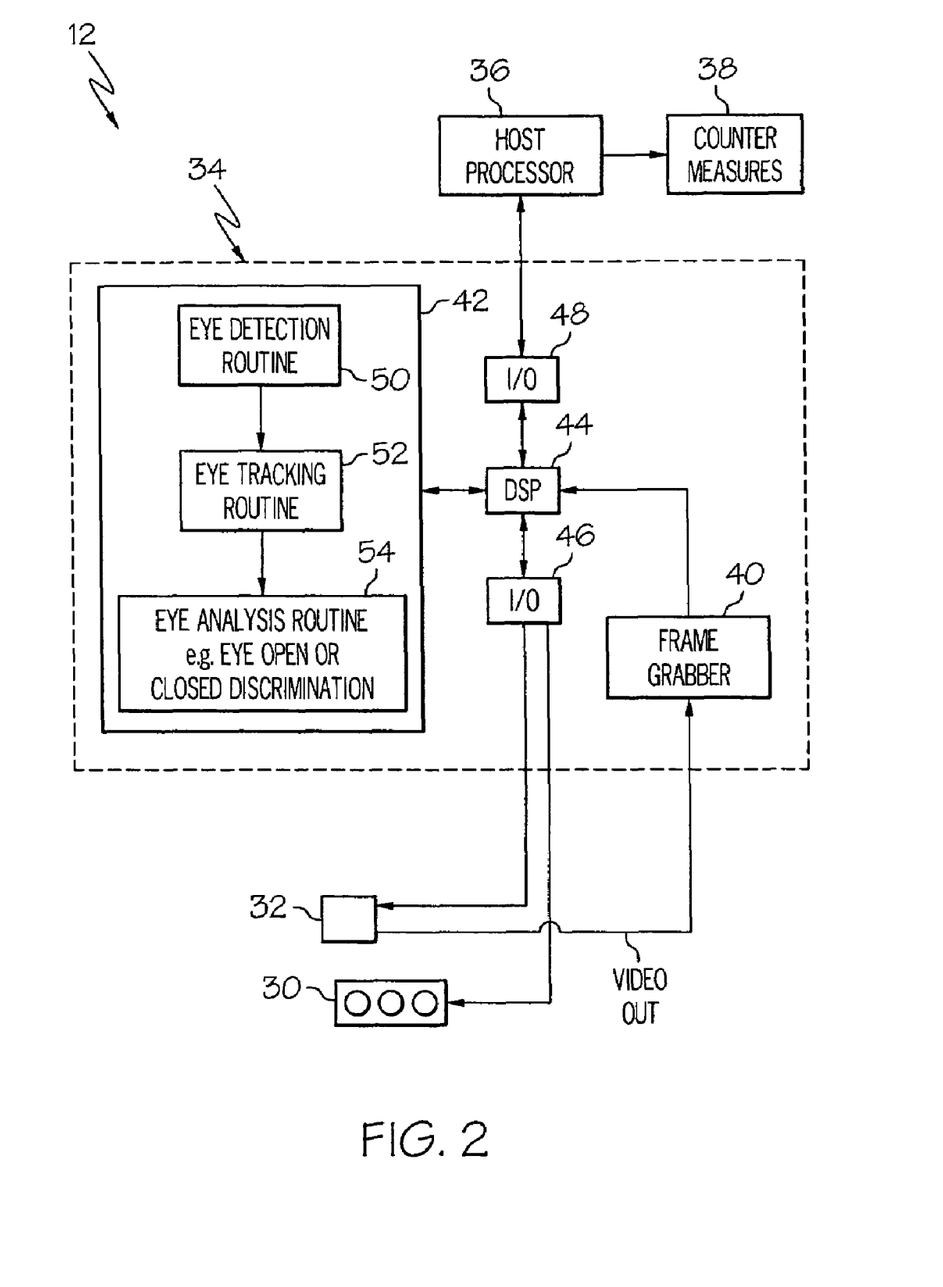
FIG. 2 depicts a block diagram of the eye monitoring apparatus of FIG. 1, including an imaging device and a microprocessor-based digital signal processor (DSP) for carrying out an eye tracking method according to the present invention.
Figure 3:
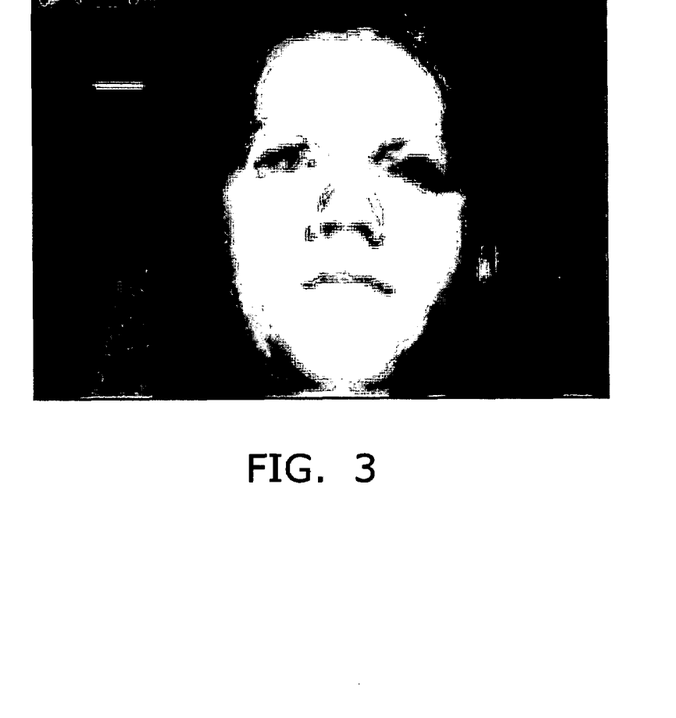
FIG. 3 depicts the head-box portion of a grey-scale video image of a vehicle occupant obtained by the imaging device of FIG. 2.

Referring to the block diagram of FIG. 2, the apparatus 12 includes an infrared (IR) light illumination device 30, a solid-state imaging device 32 and a vision processor 34. In the illustrated embodiment, the apparatus 12 provides eye state information to a remote host processor 36 via line 37, and the host processor 36 selectively activates one or more counter-measure devices or systems 38 such as an alarm or a braking system if it is determined that the driver's lack of alertness or attention may possibly compromise vehicle safety. The illumination device 30 may be an array of light emitting diodes, for example, and the imaging device 32 may be a CCD or CMOS imaging chip. The vision processor 34 comprises conventional components, including a frame grabber 40 for acquiring video images from imaging device 32, a non-volatile memory 42 for storing various signal processing routines, and a digital signal processor (DSP) 44 for selectively executing the routines stored in memory 42 processing the video images acquired by frame grabber 40. The DSP 44 outputs various control signals to illumination device 30 and imaging device 32 via interface 46, and communicates with host processor 37 via interface 48.

The signal processing routines residing in the vision processor memory 42 include an eye detection routine 50, an eye tracking routine 52, and an eye analysis routine 54. In general, the eye detection routine 50 identifies the regions of a video image that correspond to the driver's eyes 22, the eye tracking routine 52 tracks the eye location from one video image to the next, and the eye analysis routine 54 characterizes the state of the driver's eyes (open vs. closed, for example). The present invention primarily concerns the eye tracking routine 52; the eye detection routine 50, the eye analysis routine 54 and the routines executed by host processor 36 for using the eye state information may comprise any of a number of known processing techniques.

Figure 5:
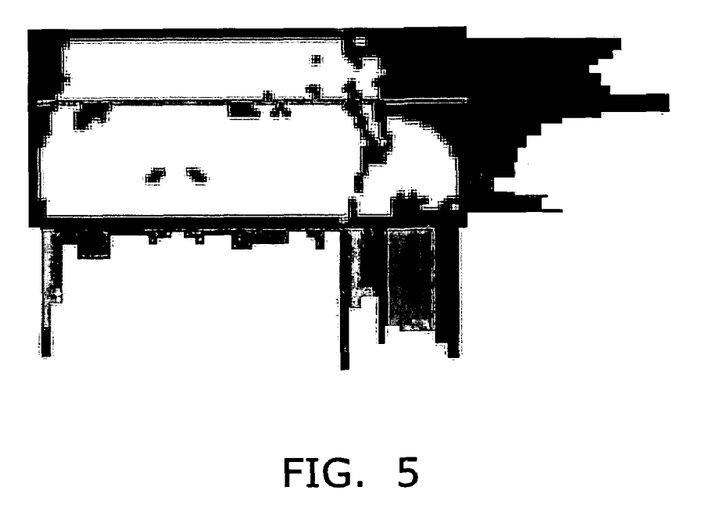
FIG. 5 depicts the eye-box portion of a filtered and binarized "dark image" version of the gray-scale image of FIG. 3, where light pixels of the un-binarized image are considered as foreground, along with horizontal projection histogram data for the image.
Figure 6:
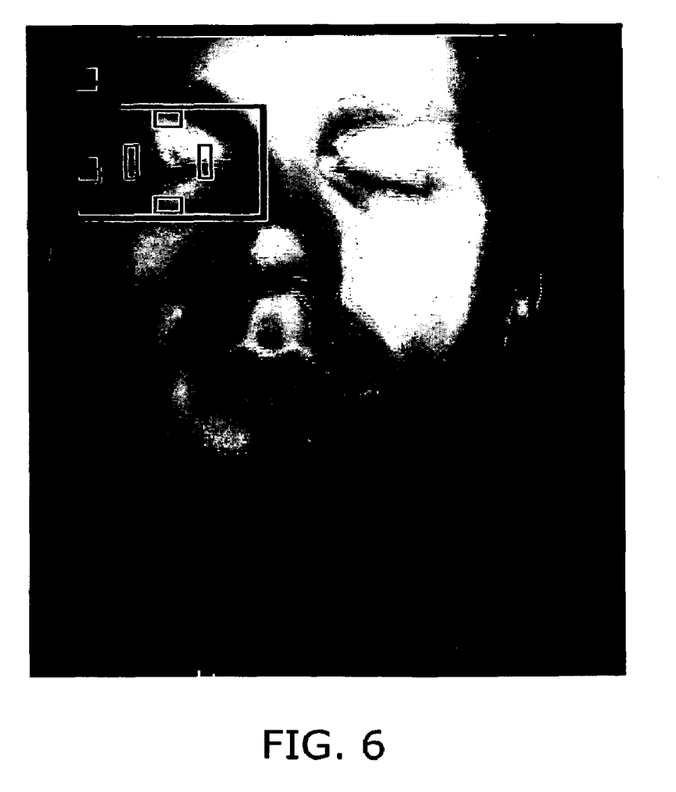
FIG. 6 depicts a grey-scale image of a vehicle occupant obtained by the imaging device of FIG. 2, where eye-box search windows and peripheral eye-related patches are identified by rectangular boxes.
Figure 7:
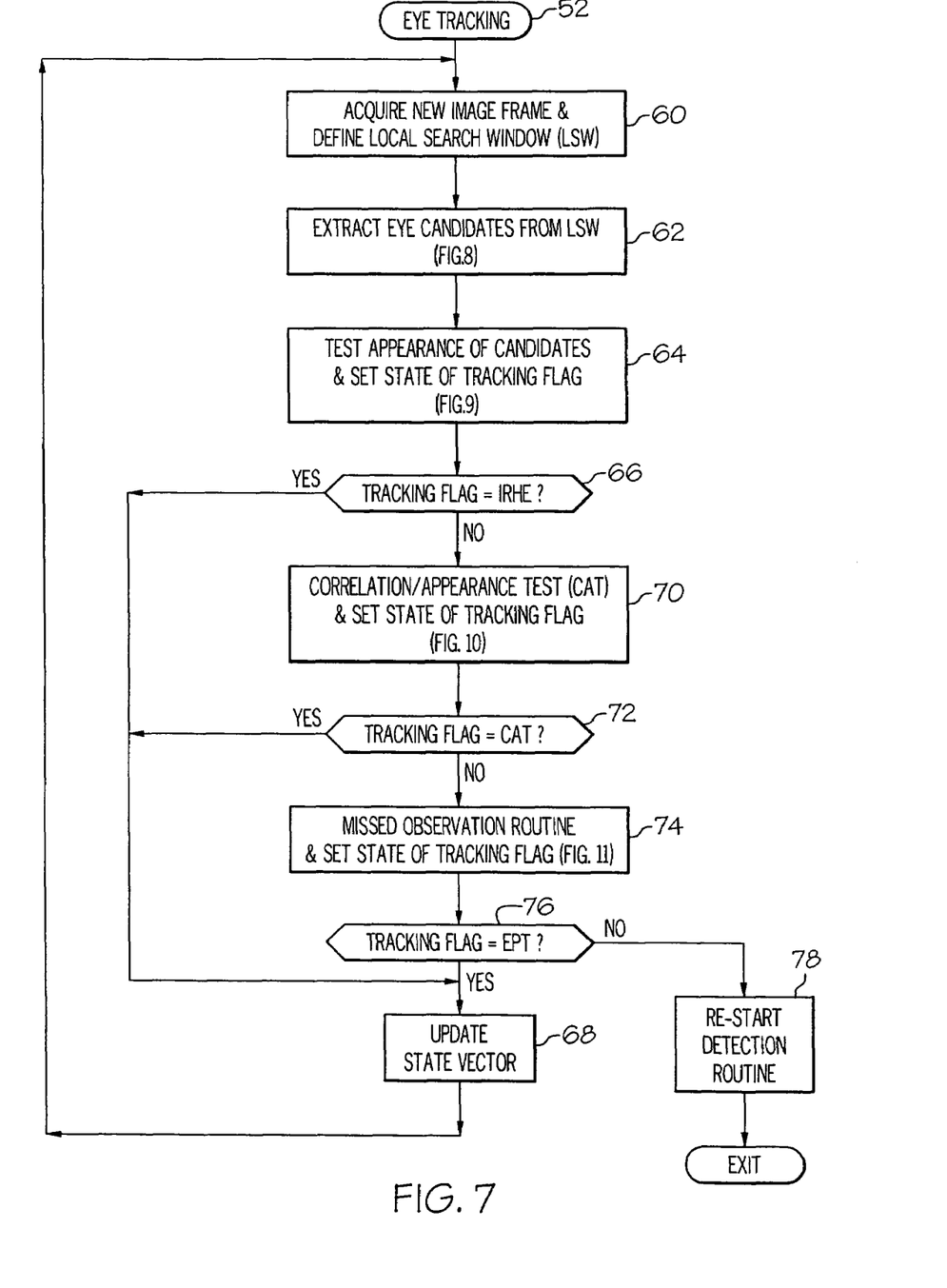
FIG. 7 is a main flow diagram of an eye tracking routine executed by the DSP of FIG. 2 according to this invention.

The eye tracking routine 52 is broadly described by the main loop flow diagram of FIG. 7, and is illustrated in part by the images of FIGS. 3-6. The flow diagrams of FIGS. 8-11 detail various aspects of the mail loop flow diagram.

Referring to FIG. 7, the block 60 is first executed to acquire a new image frame and to extract a local search window (LSW) of predetermined size, centered on the last-identified location of the occupant's eye. In the image of FIG. 6, for example, the local search window for the occupant's right eye is designated by a large solid-lined rectangle.

Once the LSW of the new image frame is defined, the blocks 62 and 64 are executed to extract eye candidates from the LSW using an inverse receptive hole extraction (IRHE) technique and to test the extracted eye candidates to determine if they should be accepted. As indicated, the functionality of block 62 is detailed in the flow diagram of FIG. 8, and the functionality of block 64 is detailed in the flow diagram of FIG. 9. If at least one eye candidate is accepted, the block 62 sets the status of a Tracking Flag to IRHE; otherwise, the status of the Tracking Flag is set to NONE. The block 66 then checks the status of the Tracking Flag. If block 66 determines that the Tracking Flag status is IRHE, block 68 is executed to update a state vector that marks the location of the eye, whereafter the routine is re-executed for the next image frame. If the Tracking Flag status is NONE, the IRHE technique was unsuccessful, and DSP 44 executes block 70 to perform an alternate eye extraction technique using correlation and appearance testing (CAT). As indicated, the functionality of block 70 is detailed in the flow diagram of FIG. 10. The block 70 also sets the status of the Tracking Flag—if at least one eye candidate is extracted and accepted, block 70 sets the status of the Tracking Flag to CAT; otherwise, the status of the Tracking Flag is set to NONE. The block 72 then checks the status of the Tracking Flag. If the Tracking Flag status is CAT, block 68 is executed to update the eye location state vector as explained above. If the Tracking Flag status is NONE, the alternate eye extraction technique of block 70 was also unsuccessful. This can occur, for example, when the driver's eye is closed. In this case, DSP 44 executes the missed-observation routine of block 74 to determine if the eye location can be identified based on peripheral eye-related patches. As indicated, the functionality of block 74 is detailed in the flow diagram of FIG. 11. Block 74 also sets the status of the Tracking Flag—if at least one eye candidate is identified and accepted, the status of the Tracking Flag is set to EPT; otherwise, the status of the Tracking Flag is set to NONE. Finally, the block 76 checks the status of the Tracking Flag. If the Tracking Flag status is EPT, block 68 is executed to update the eye location state vector as explained above. If the Tracking Flag status is NONE, the occupant's previously detected eye could not be successfully tracked, and the block 78 is executed to re-start the eye detection routine 50.

Figure 4:
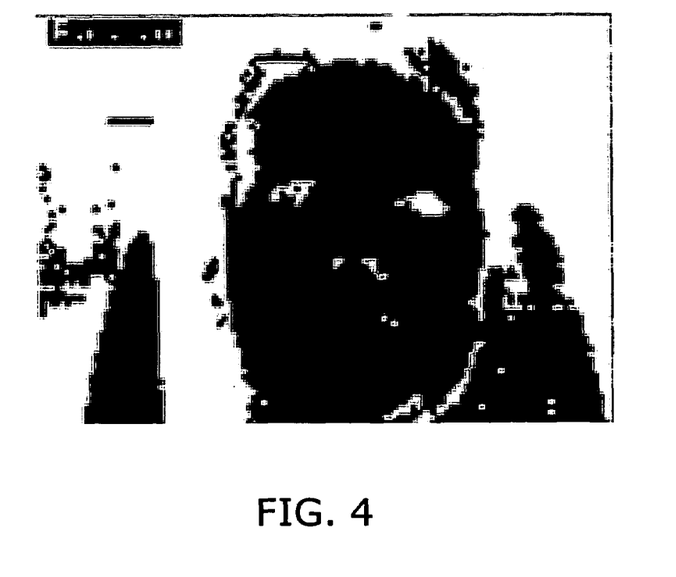
FIG. 4 depicts a filtered and binarized "white image" version of the gray-scale image of FIG. 3, where dark pixels of the un-binarized image are considered as foreground.
Figure 8:
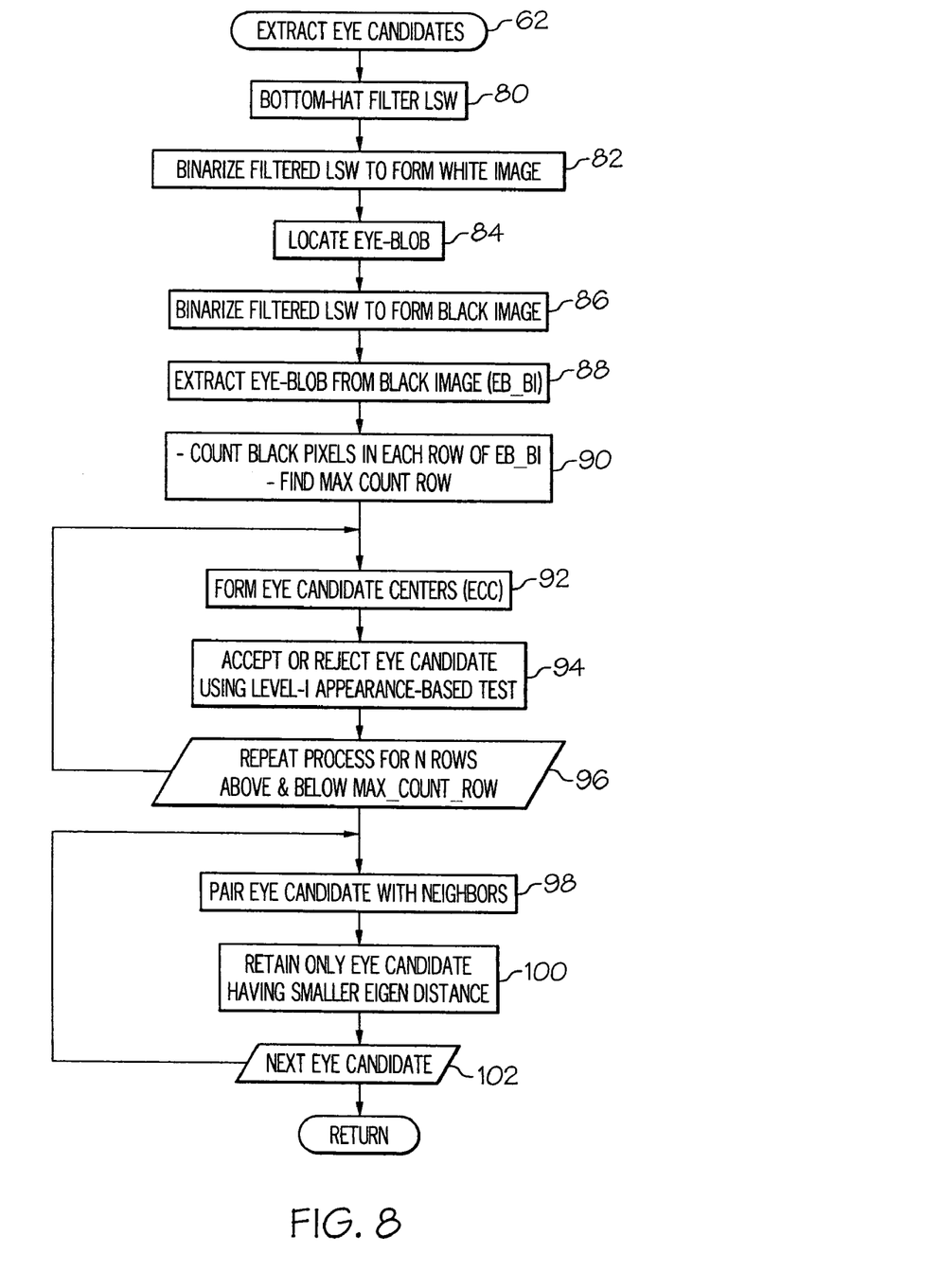
FIG. 8 is a flow diagram detailing a portion of the main flow diagram of FIG. 7 pertaining to extraction of eye candidates from an eye-box search window.

Referring to FIG. 8, the process of extracting eye candidates from the local search window (i.e., block 62 of FIG. 7) is initiated at blocks 80 and 82 which apply a morphological bottom-hat filter to the LSW and binarize the filtered image. The bottom-hat filter is implemented with a mask of pre-defined size, and generally serves to suppress extraneous pixel information and emphasize the edges of objects and other definable features and regions within the LSW. The filtered image is initially binarized to form a "white image"—i.e., an image in which the dark pixels of the filtered image are represented by white pixels, and light pixels of the filtered image are represented by black pixels. FIG. 4 depicts a "white image" version of a typical LSW—it is seen that the occupant's facial skin and other highly reflective regions are represented by black pixels, while dark regions such as the occupant's iris and pupil are represented by white pixels.

The block 84 scans the "white image" developed at block 80 to identify the largest "blob" of contiguous white pixels (referred to herein as an "eye-blob") and to define a rectangular patch of the image (boundary box) that bounds the identified eye-blob. The filtered image of block 80 is then binarized at block 86 to form a "black image" which is the opposite of the "white image" depicted in FIG. 4. In other words, dark pixels of the filtered image (i.e., the occupant's iris and pupil) are represented by black pixels in the black image, and light pixels of the filtered image (i.e., the occupant's facial skin) are represented by white pixels. The block 88 extracts a patch of the binarized black image corresponding to the eye-blob boundary box defined at block 84. An extracted black-image eye-blob patch based on the image of FIG. 4 is depicted in the upper left-hand corner of FIG. 5.

Once the "black-image" eye-blob patch has been extracted, block 90 is executed to count the number of black pixels (receptive holes) in each horizontal line or row of the patch. In FIG. 5, the pixel counts are represented by the histogram to the right of the eye-blob patch. In most cases, the highest pixel count will generally occur in the pixel rows that correspond to the occupant's pupil, as is the case in the example of FIG. 5. Block 90 identifies the pixel row having the highest pixel count or receptive hole content (MAX_COUNT_ROW) and block 92 identifies each black pixel in that row as an eye candidate center.

Block 94 extracts a grey-scale image patch of predetermined size centered about each eye candidate identified at block 92, and performs an appearance-based test (eye vs. non-eye) of each patch. The appearance-based test utilizes an Eigen analysis in which Eigen-space distances between a respective candidate grey-scale patch and relatively low resolution (Level-I) eye and non-eye models are computed. Any candidate patch that resembles the LEVEL-I eye model will have a relatively short eye distance and a relatively long non-eye distance; any candidate patch that resembles the Level-I non-eye model will have a relatively short non-eye distance and a relatively long eye distance. The distances are compared to thresholds to classify the eye candidates as DESIRED, UNDESIRED or UNSURE. The DESIRED classification indicates a high confidence determination that an eye candidate is the center of the occupant's eye; i.e., that it resembles the Level-I eye model, and does not resemble the Level-I non-eye model. Conversely, the UNDESIRED classification indicates a high confidence determination that the eye candidate is a non-eye feature; i.e., that it resembles the Level-I non-eye model, and does not resemble the Level-I eye model. The UNSURE classification indicates that a high confidence determination cannot be made. The confidence metric is based on the separation between the eye distance and the non-eye distance, with larger separation signifying higher confidence in the appearance determination. Only those eye candidates classified as UNSURE or DESIRED are retained; eye candidates classified as UNDESIRED are eliminated from a list of identified eye candidates. The eye distances and classifications of the retained eye candidates are stored for use in a clustering portion of the extraction routine. As indicated by block 96, the process defined by blocks 92-94 is repeated for a predefined number N of pixel rows above and below MAX_COUNT_ROW. The predefined number N depends on the application, and may be determined based on the available processing time. The end result is a list of potential eye candidates, each comprising an eye-sized patch of the grey-scale image.

The blocks 98 and 100 are then executed to cluster the extracted eye candidates. The block 98 pairs a selected eye candidate with neighboring eye candidates—i.e., with any eye candidate whose center is within a predetermined coordinate-space distance of the selected eye candidate. If such pairing is possible, the block 100 compares the stored Eigen eye distances for the respective eye candidates; the eye candidate having the smallest Eigen eye distance is retained, while the other eye candidate(s) is removed from the eye candidate list. As indicated at block 102, the process defined by blocks 98-100 is then repeated for the next eye candidate until every eye candidate in the list has been processed.

Figure 9:
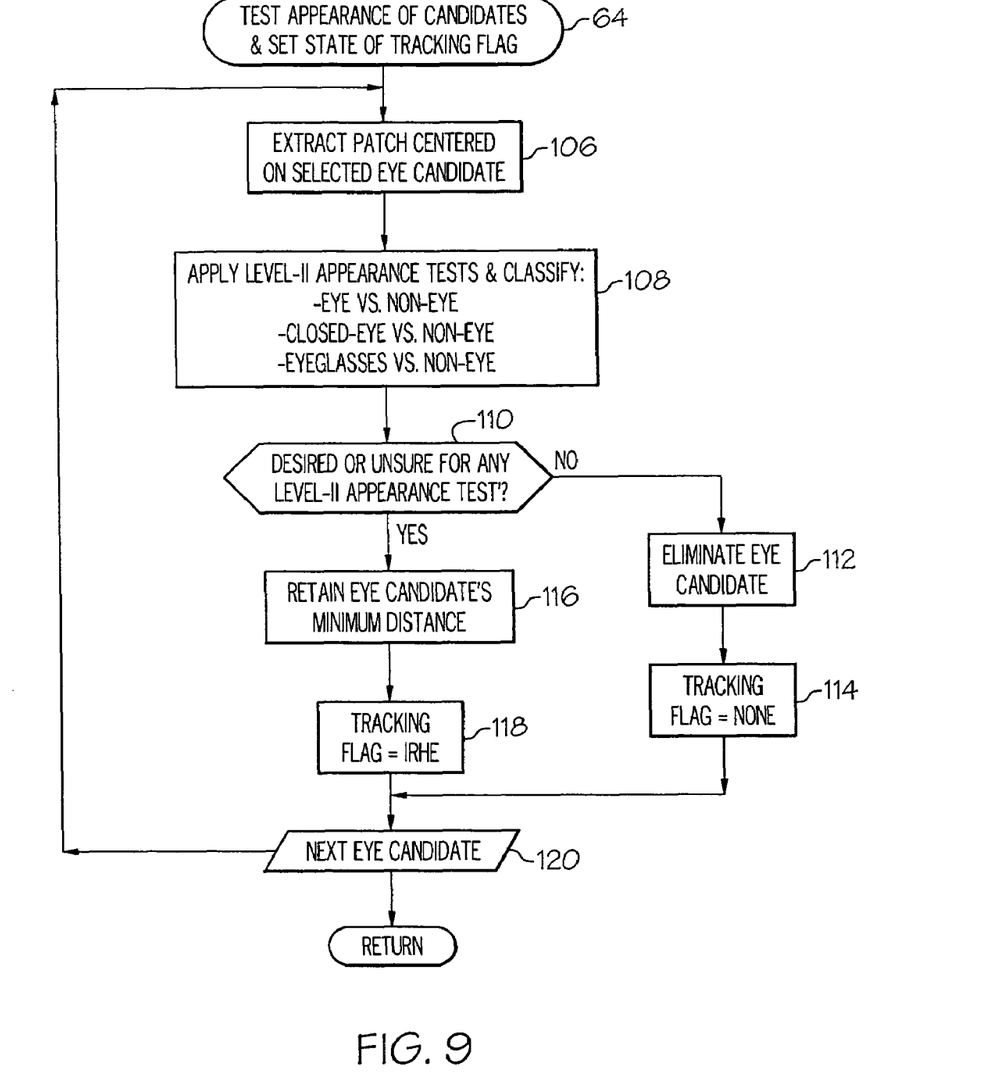
FIG. 9 is a flow diagram detailing a portion of the main flow diagram of FIG. 7 pertaining to appearance testing of extracted eye candidates.

Referring to FIG. 9, the process of appearance testing the retained eye candidates (i.e., block 64 of FIG. 7) begins at block 106 where DSP 44 extracts a gray-scale patch of the LSW centered on a selected eye candidate. The block 108 then computes Eigen-space distances between the eye candidate and various Level-II models and compares the distances to thresholds to classify the respective eye candidate as DESIRED, UNDESIRED or UNSURE as described above in reference to block 94 of FIG. 8. In the illustrated embodiment, there are three sets of Level-II appearance-based tests: eye vs. non-eye; closed-eye vs. non-eye; and eyeglasses vs. non-eye. Block 110 then checks the classification results. If the selected eye candidate is classified as UNDESIRED by all three tests, the blocks 112 and 114 are executed to eliminate the eye candidate from the list and to set the Tracking Flag to NONE. If the eye candidate is classified as DESIRED or UNSURE by at least one of the tests, the blocks 116 and 118 are executed to store the minimum Eigen distance attributed to the eye candidate and to set the Tracking Flag to IRHE. As indicated at block 120, the process defined by blocks 106-118 is then repeated for the next eye candidate until every eye candidate in the list has been selected.

Figure 10:
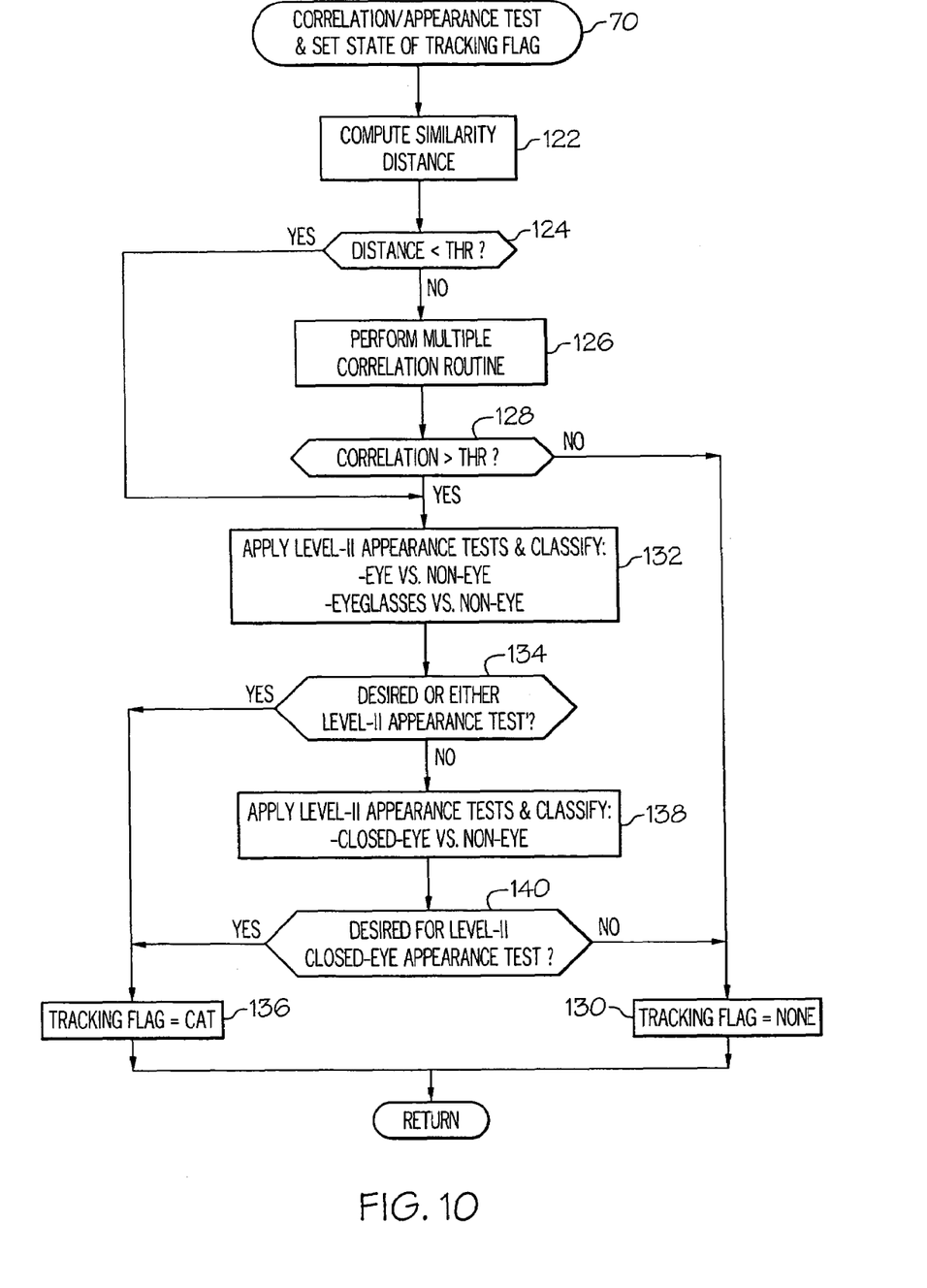
FIG. 10 is a flow diagram detailing a portion of the main flow diagram of FIG. 7 pertaining to a correlation/appearance technique for identifying eye candidates in an eye-box search window.

Referring to FIG. 10, the correlation/appearance testing (i.e., block 70 of FIG. 7) involves attempting to locate an eye within the LSW by correlation (blocks 122-128), and if successful, conducting appearance-based testing of each identified eye candidate (blocks 132-140). The block 122 computes a similarity distance (i.e., a single normalized cross-correlation) between a grey-scale eye-box patch from the previous image frame and a corresponding patch from the current image frame. The block 124 compares the computed similarity distance to a threshold THR. If the distance is less than THR, the patches compare favorably, and block 132 is executed to begin appearance testing of the patch from the current image frame. If block 124 is answered in the negative, the block 126 is executed to compute a multiple, or pixel-by-pixel, correlation matrix between the grey-scale eye-box patch from the previous image frame and the LSW. This time, the block 128 checks if any of the correlation values exceed a threshold such as 90%. If so, the DSP 44 is directed to block 132 to begin appearance testing of the identified region(s) of the LSW. If not, an eye candidate could not verified by correlation, and the block 130 is executed to set the Tracking Flag to NONE. If blocks 122 or 126 do identify a high-correlation eye candidate, the block 132 computes Eigen-space distances between the eye candidate and various Level-II models and compares the distances to thresholds to classify the respective eye candidate as DESIRED, UNDESIRED or UNSURE as described above in reference to FIGS. 8-9. Here, block 132 compares the eye candidate to two different sets of Level-II appearance-based models: eye vs. non-eye; and eyeglasses vs. non-eye. Block 134 then checks the classification results. If the eye candidate is classified as DESIRED by either test, the block 136 is executed to set the Tracking Flag to CAT. Otherwise, the block 138 computes Eigen-space distances between the eye candidate and Level-II appearance models to judge closed-eye vs. non-eye and the corresponding classification. If the classification is DESIRED, the block 140 directs DSP 44 to set the Tracking Flag to CAT; otherwise the block 130 is executed to set the Tracking Flag to NONE.

Figure 11:
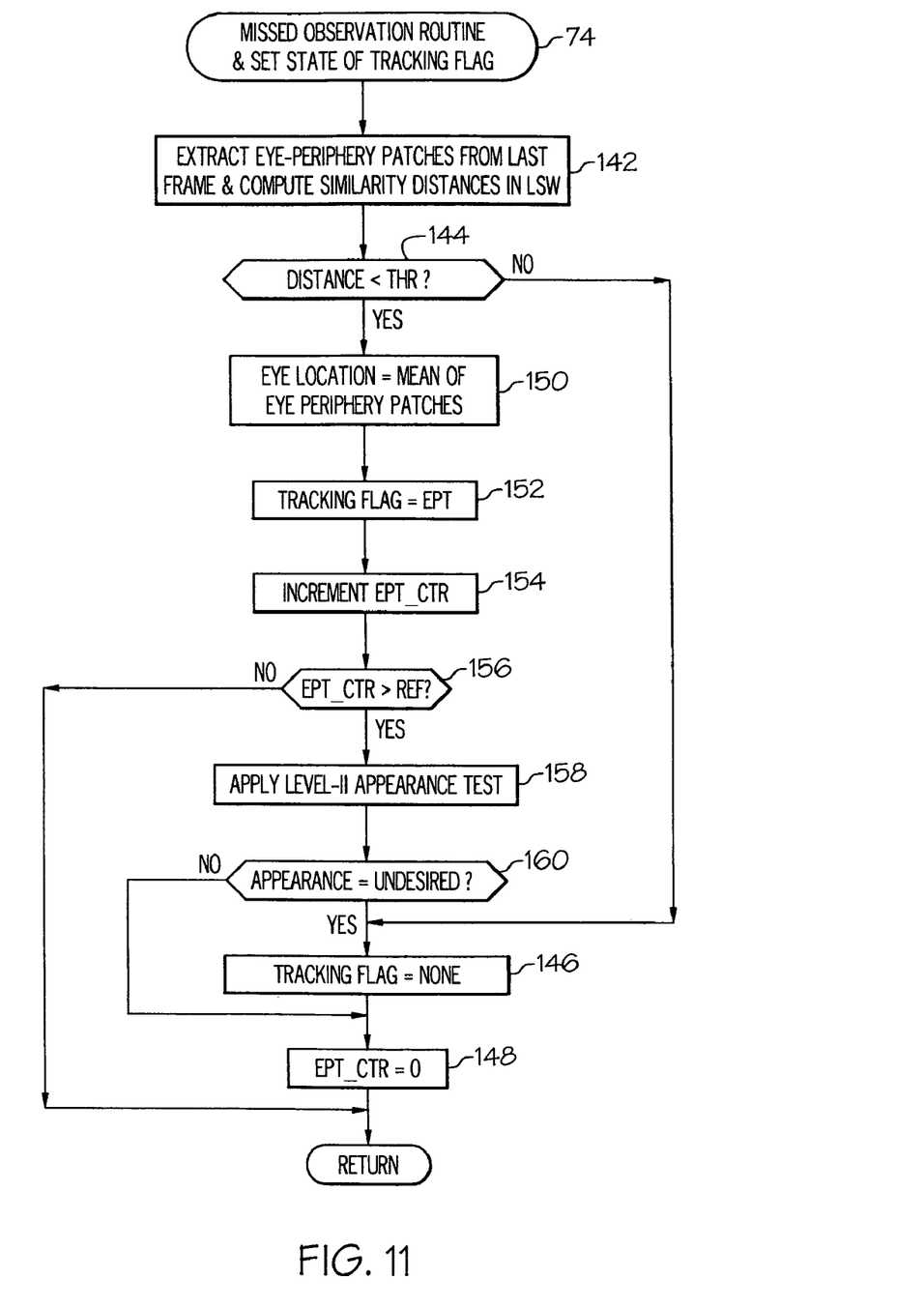
FIG. 11 is a flow diagram detailing a portion of the main flow diagram of FIG. 7 pertaining to an eye periphery comparison technique for identifying eye candidates in an eye-box search window.

Referring to FIG. 11, the missed observation routine (i.e., block 74 of FIG. 7) is initiated at block 142 which extracts a set of eye-periphery image patches from the previous image frame and attempts to identify comparable patches in the LSW. The extracted image patches are clustered about, and geometrically symmetrical with respect to, the previously detected eye location. The image of FIG. 6 illustrates a mechanization in which DSP 44 extracts a set of four eye-periphery image patches. However, it should be understood that the number and placement of the eye-periphery patches may be different than shown. In order to identify comparable patches in the LSW, DSP 44 computes and evaluates a similarity distance between the extracted patches and each set of potentially matching patches in the LSW. The block 144 compares the similarity distances to a threshold THR. If less than a specified number of matches are found, the missed observation routine is unsuccessful, and the blocks 146 and 148 are executed to set the Tracking Flag to NONE and to reset a counter EPT_CTR to zero. However, if at least a specified number of matches are found, block 144 is answered in the affirmative, and blocks 150 and 152 are executed to compute the eye center according to the mean (center) of the matching eye-periphery patches and to set the Tracking Flag to EPT. Additionally, the block 154 increments EPT_CTR, and block 156 compares the count to a reference count REF such as sixty (which corresponds to two seconds at a frame rate of 30 Hz). If DSP 44 relies on eye-periphery tracking for REF successive image frames, block 156 is answered in the affirmative, and blocks 158 and 160 are executed to perform an appearance check to determine if the located eye region resembles a closed eye. The block 158 extracts a grey-scale eye patch centered on the computed eye center and computes Eigen-space distances between the eye patch and Level-II appearance models to judge closed-eye vs. non-eye and the corresponding classification. The block 160 checks the classification. If the classification is UNDESIRED, the blocks 144 and 146 are executed to set the Tracking Flag to NONE and to reset EPT_CTR to zero; otherwise, the status of the Tracking Flag is maintained as EPT and the block 148 is executed to reset EPT_CTR to zero.

In summary, the method of the present invention provides a multi-faceted approach to eye tracking that minimizes lost eyes even in situations where the person's head turns or the eyes momentarily close. While the present invention has been described with respect to the illustrated embodiment, it is recognized that numerous modifications and variations in addition to those mentioned herein will occur to those skilled in the art. For example, the method of this invention may be applied to a human facial feature other than an eye, or to a distinguishable target feature in general. Accordingly, it is intended that the invention not be limited to the disclosed embodiment, but that it have the full scope permitted by the language of the following claims.

The invention claimed is:

1. A method of detecting and tracking an eye in a succession of video images of a human subject to assess and characterize a state of the human subject, the method comprising the steps of:
   acquiring a first video image in the succession of video images and processing it to detect the human subject's eye and designate a location of the detected eye in the first video image;
   acquiring a second video image after acquiring said first video image, and then:
   (a) extracting an image search patch from the second video image centered on the designated location of the eye in the first video image;
   (b) identifying eye candidates within said extracted image search patch and accepting or rejecting the identified eye candidates based on appearance; and
   (c) if none of the identified eye candidates are accepted based on appearance:
      (i) extracting a set of eye periphery image patches from the first video image that are clustered about the designated location of the eye;
      (ii) searching the image search patch extracted from the first video image to locate a set of image patches within the image search patch that match the eye periphery image patches extracted from the first video image; and
      (iii) if a matching set of image patches is located in the image search patch, determining a center of the matching set of image patches from the second video image, and designating the location of the eye in the second video image as the determined center;
   (d) wherein the forementioned steps are implemented by a processor.

2. The method of claim 1, where the step of identifying eye candidates from said extracted image search patch includes the steps of:
   filtering and binarizing said extracted image search patch to form a search window;
   projecting horizontal rows of pixels in said search window and selecting one or more rows of maximal receptive hole content;
   identifying and clustering pixels disposed in the selected rows of maximal receptive hole content to form potential eye candidates; and
   testing said potential eye candidates based on spatial and physiological considerations to select one or more winning eye candidates.

3. The method of claim 2, including the steps of:
   extracting eye-sized patches of said second video image centered on the identified receptive hole pixels;
   testing the extracted eye-sized patches for eye vs. non-eye appearance and eliminating patches that exhibit non-eye appearance; and
   designating non-eliminated eye-sized patches as eye candidates.

4. The method of claim 1, where the extracted set of eye periphery image patches are geometrically symmetrical with respect to the designated eye location in the first video image.

5. The method of claim 1, where the step of searching the extracted image search patch includes the step of:
   evaluating a similarity distance between the extracted eye periphery image patches and various sets of potentially matching image patches in the extracted image search patch.

6. The method of claim 1, where the method includes the step of:
   performing an appearance check on the extracted image search patch to determine if it resembles a closed human eye.

* * * * *